United States Patent
Waye et al.

(10) Patent No.: US 12,229,907 B2
(45) Date of Patent: Feb. 18, 2025

(54) SYSTEMS AND METHODS FOR DISPLAYING SUPPLEMENTAL CONTENT FOR MEDIA USING AUGMENTED REALITY

(71) Applicant: Adeia Guides, Inc., San Jose, CA (US)

(72) Inventors: Lucas Waye, Cambridge, MA (US); Theresa Tokesky, Boston, MA (US); Michael A. Montalto, South Hamilton, MA (US); Kanagasabai Sivanadian, Framingham, MA (US)

(73) Assignee: ADEIA GUIDES INC., San Jose, CA (US)

( * ) Notice: Subject to any disclaimer, the term of this patent is extended or adjusted under 35 U.S.C. 154(b) by 0 days.

(21) Appl. No.: 18/372,904

(22) Filed: Sep. 26, 2023

(65) Prior Publication Data
US 2024/0020932 A1   Jan. 18, 2024

Related U.S. Application Data

(63) Continuation of application No. 17/410,155, filed on Aug. 24, 2021, now Pat. No. 11,804,017, which is a
(Continued)

(51) Int. Cl.
| | |
|---|---|
| G06T 19/00 | (2011.01) |
| G06F 16/438 | (2019.01) |
| G06F 16/48 | (2019.01) |
| G06F 16/93 | (2019.01) |
| G06F 16/955 | (2019.01) |
| G06K 7/10 | (2006.01) |
| G06K 7/14 | (2006.01) |
| H04L 67/306 | (2022.01) |
| H04L 67/52 | (2022.01) |

(52) U.S. Cl.
CPC ........ *G06T 19/006* (2013.01); *G06F 16/4387* (2019.01); *G06F 16/48* (2019.01); *G06F 16/93* (2019.01); *G06F 16/9554* (2019.01); *G06K 7/10722* (2013.01); *G06K 7/1417* (2013.01); *H04L 67/306* (2013.01); *H04L 67/52* (2022.05)

(58) Field of Classification Search
CPC ........ G06F 16/48; G06F 16/93; G06T 19/006
See application file for complete search history.

(56) References Cited

U.S. PATENT DOCUMENTS

| | | |
|---|---|---|
| 8,576,276 B2 | 11/2013 | Bar-Zeev et al. |
| 10,083,547 B1 | 9/2018 | Tomatsu |

(Continued)

OTHER PUBLICATIONS

Azuma et al., "Evaluating Label Placement for Augmented Reality View Management," Proceedings of the Second IEEE and ACM International Symposium on Mixed and Augmented Reality (ISMAR '03) (2003) (10 pages).

*Primary Examiner* — Charles Tseng
(74) *Attorney, Agent, or Firm* — HALEY GUILIANO LLP

(57) ABSTRACT

Systems and methods are provided for displaying supplemental content for print media using augmented reality. A user profile for a user of an augmented reality device is determined. Content of the print media is searched to identify a first portion of the print media that matches the user profile and a second portion of the print media that does not match the user profile. Supplemental content is obtained based on content of the first portion of the print media. A display of the supplemental content is positioned over the second portion of the print media.

18 Claims, 10 Drawing Sheets

Related U.S. Application Data continuation of application No. 16/749,444, filed on Jan. 22, 2020, now Pat. No. 11,127,219, which is a continuation of application No. 15/940,198, filed on Mar. 29, 2018, now Pat. No. 10,580,215.

(56) References Cited

U.S. PATENT DOCUMENTS

| | | |
|---|---|---|
| 11,127,219 B2 | 9/2021 | Waye et al. |
| 11,804,017 B2 | 10/2023 | Waye et al. |
| 2003/0105826 A1 | 6/2003 | Mayraz |
| 2006/0089969 A1 | 4/2006 | Brown et al. |
| 2006/0126932 A1 | 6/2006 | Eschbach |
| 2008/0134083 A1 | 6/2008 | Farouki |
| 2009/0125510 A1 | 5/2009 | Graham et al. |
| 2013/0147836 A1* | 6/2013 | Small ................. G06T 19/006 345/633 |
| 2013/0325463 A1 | 12/2013 | Greenspan et al. |
| 2014/0171039 A1* | 6/2014 | Bjontegard ........... H04L 67/535 455/414.1 |
| 2014/0210857 A1 | 7/2014 | Liu et al. |
| 2015/0049113 A1 | 2/2015 | Rahman et al. |
| 2015/0310667 A1 | 10/2015 | Young et al. |
| 2016/0049013 A1 | 2/2016 | Tosas Bautista |
| 2016/0133054 A1 | 5/2016 | Honjo et al. |
| 2018/0089335 A1 | 3/2018 | Huang et al. |
| 2018/0130376 A1 | 5/2018 | Meess et al. |
| 2018/0197336 A1 | 7/2018 | Rochford et al. |
| 2019/0155884 A1 | 5/2019 | Liu et al. |
| 2019/0289341 A1* | 9/2019 | Vasco de Oliveira Redol ............ G02B 27/017 |
| 2020/0394842 A1 | 12/2020 | Baillard et al. |
| 2021/0383614 A1 | 12/2021 | Waye et al. |

* cited by examiner

700

710 — Determine a User Profile for a User of an Augmented Reality Device

720 — Search Content of the Print Media to Identify a First Portion of the Print Media that Matches the User Profile and a Second Portion of the Print Media that does not Match the User Profile 730 — Obtain Supplemental Content Based on Content of the First Portion of the Print Media 740 — Position a Display of the Supplemental Content Over the Second Portion of the Print Media

1110
Process for Searching the Database Based on the First Set of Keywords

1120
Access from the Database a List of Content in the Print Media

1130
Identify from the List of Content Other Content that is Related to the First Set of Keywords 1140
Determine that the Other Content is Located in a Second Page of the Print Media 1150
Provide as the Supplemental Content the Other Content and a Reference to the Second Page of the Print Media

FIG. 11

SYSTEMS AND METHODS FOR DISPLAYING SUPPLEMENTAL CONTENT FOR MEDIA USING AUGMENTED REALITY

CROSS-REFERENCE TO RELATED APPLICATION

This application is a continuation of U.S. patent application Ser. No. 17/410,155, filed Aug. 24, 2021, which is a continuation of U.S. patent application Ser. No. 16/749,444, filed Jan. 22, 2020, now U.S. Pat. No. 11,127,219 which is a continuation of U.S. patent application Ser. No. 15/940,198, filed Mar. 29, 2018, now U.S. Pat. No. 10,580,215, which are hereby incorporated by reference herein in their entireties.

BACKGROUND

Users typically enjoy consuming content in various forms including digitally and physically. For example, a user may consume content on a television or read print media, such as newspapers, photographs and magazines. In both cases, sometimes the content the user is consuming is related to other content that may interest the user. Conventional systems may inform the user about the related content and may even present the related content together with the primary content the user is viewing. Particularly, conventional systems attempt to combine use of augmented reality devices with media presented in other forms (e.g., print media) to enhance a user's experience with the media. However, in many cases, the related content presented in the augmented reality device may block portions of the primary content or replace it entirely, which negatively impacts the user experience. For example, conventional systems may detect that the user is reading a newspaper article and may augment the newspaper article (which may be outdated), using augmented reality devices, with more up-to-date content using augmented reality. Such systems, though, fail to intelligently time presentation or select where to present the augmented content and simply replace the outdated article the user is reading with the updated content. This results in the user potentially losing sight of the article the user was interested in and ends up confusing or distracting the user.

SUMMARY

Accordingly, systems and methods are provided for displaying supplemental content for print media using augmented reality. In particular, systems and methods are provided for intelligently positioning augmented reality content related to print media over portions of the print media that are not of interest to the user. For example, a user may browse a physical copy of print media, such as a newspaper, while using an augmented reality device, such as augmented reality goggles. The system may identify different sections of a page the user is currently reading. For example, the system may identify different articles, one pertaining to sports and another to politics. The system may determine which sections contain content that is of interest to the user and which sections do not. For example, the system may determine the user likes the sports section but not the politics section of the page. The system may identify and retrieve content related to the sports column, which the user is interested in, such as video highlights and pictures of the sport featured in the column. The system may then present the content related to the sports column over the politics section in the augmented reality device so that none of the sections of interest to the user (e.g., the sports column content) is blocked from view.

In some embodiments, a media guidance application (implemented at least partially on an augmented reality device) may detect that the user is currently reading or viewing print media. In response, the media guidance application may determine a user profile for a user of the augmented reality device. For example, the media guidance application may listen to the user's voice, capture a fingerprint or retina scan, determine a size of the user's head, or request a user's login information to determine who the user is that is using the augmented reality device. After confirming the user's identity, the media guidance application may search an online or local database for a profile associated with the user. The profile may specify one or more attributes that are of interest and that are not of interest to the user. For example, the user profile may specify that the user likes to consume content about weather and sports but not about politics. The attributes may also specify levels of interest in each or some of the attributes.

The media guidance application may process an area of the print media to identify first and second portions of the print media within the area. For example, the media guidance application may capture an image of a page that the user is currently reading of the newspaper to identify different articles in the page. In some implementations, the media guidance application may send the captured image to a local or remote image processing engine. The image processing engine may be a dedicated hardware device for performing image processing or may be a general purpose processor (GPU) programmed to execute an image processing algorithm. The image processing engine may analyze the image to detect an object separating a first collection of text from a second collection of text. For example, the image processing engine may identify where text is on the newspaper page that is completely or partially bordered by horizontal or vertical bars or lines. Each area of text that is bordered partially or completely by the bars or lines may be defined as a different collection of text. The image processing engine may determine whether the first and second collections of text include respective headings. For example, the image processing engine may analyze the fonts in each collection of text to determine whether there are different sized fonts. In response to detecting that a given collection of text has a majority of text in a font of a threshold size that is less than a font size of other text in the same collection, the image processing engine may associate the given collection of text with one article in the page. Particularly, the image processing engine may label or store an indication that the given collection pertains to the same article in the page. Similarly, in response to detecting that the second collection of text has a majority of text in a font of a threshold size that is less than a font size of other text in the second collection, the image processing engine may associate the second collection of text with a second article in the page. Particularly, the image processing engine may label or store an indication that the second collection pertains to the second article in the page.

In some embodiments, the media guidance application may generate a first set of keywords associated with the first portion and a second set of keywords associated with the second portion. For example, the media guidance application may search text in the first article and text in the second article of the newspaper page to select nouns, verbs and predetermined words. The media guidance application may store the selected nouns, verbs and predetermined words that appear in the text of the first article as a first set of keywords that identify the first article. The media guidance application may search an online or local database using some or all of the selected words to identify and retrieve related words to add to the first set of keywords. The media guidance application may perform a similar analysis and word selection for each other article on the page to generate second, third and fourth sets of keywords. The media guidance application may generate characteristics that represent each of the sets of keywords and may compare the characteristics to the attributes stored in the user profile.

The media guidance application may determine, based on comparing the keywords and/or their characteristics to the user profile, that the first portion of the print media matches the user profile and the second portion of the print media does not match the user profile. For example, the media guidance application may generate a characterization of the first article (the first portion) that identifies the first article as being related to sports, and the media guidance application may generate a characterization of the second article (the second portion) that identifies the second article as being related to politics. The media guidance application may compare the characterizations to the user profile to determine that, because the user profile specifies the user likes sports but not politics, the first article matches the user profile and the second article does not.

The media guidance application may search a database based on the first set of keywords to obtain supplemental content related to the first portion of the print media. For example, the media guidance application may select the sports article of the newspaper that matches the user profile for searching for supplemental content or content related to the selected article. The media guidance application may search one or more websites, social networks, or remote databases for content having metadata that matches a threshold number of the first set of keywords of the sports article. For example, if the sports article is about the New York Knicks v. Chicago Bulls game, the media guidance application may search a sports source (e.g., ESPN) for updated standings, photographs, and videos related to the game and/or may search a social network associated with the user for posts or comments about the game submitted by other users. Any matching content may be selected as the supplemental content related to the article. The media guidance application may search metadata of media generated by the user (e.g., a user's photographs stored on the user's mobile phone) to identify metadata that relates to the game. For example, the media guidance application may identify a time period associated with the game and a location and may determine whether any photographs stored on the user's phone are associated with metadata that matches the time period and location of the game. In particular, the user may have attended the game and taken pictures of the game. Each picture may be geo-tagged using GPS with the game's location and may be associated with a date and time of the game. As a result, the pictures may match the game's time period and location and may be selected as being related to the game for use as the supplemental content.

There are many different ways for the media guidance application to identify supplemental content. In some implementations, the media guidance application may determine that a keyword of the first set of keywords relates to a geographical area. For example, the media guidance application may determine that the sports article about the New York Knicks v. Chicago Bulls game relates to the Chicago area because the title of the game indicates that the New York Knicks were playing or visiting the Chicago Bulls, who are located in the Chicago area. The media guidance application may access a database of a collection of media assets generated by the user. For example, the media guidance application may access a remote storage (e.g., iCloud drive) of the user to identify a set of pictures and videos the user has taken in the past. The media guidance application may retrieve metadata associated with the collection of media assets. For example, the media guidance application may retrieve GPS information for each media asset in the collection. The media guidance application may identify a given media asset associated with metadata that matches the geographical location by determining that the GPS information corresponds to a location that is within a threshold range of the Chicago area. In response to identifying that the given media asset corresponds to the geographical area of the first set of keywords, the media guidance application may select that given media asset as the supplemental content for the article about New York Knicks v. Chicago Bulls game.

In some embodiments, the media guidance application may identify a plurality of media assets associated with the geographical area of the sports article. Some of the media assets may be generated by the user (e.g., stored on the remote or local storage of the user) and some may be generated by other users or other content sources. The media guidance application may add the plurality of media assets and the given media asset to a playlist and may provide the playlist as the supplemental content. The playlist may represent an ordered list of media assets that are presented simultaneously or in a given sequence to a user automatically.

In some embodiments, the first and second portions of the print media may be in a first page of the print media. In such circumstances, the media guidance application may access from a database a list of content in the print media. For example, the media guidance application may retrieve from a database a list of all of the articles that are in the print media and their respective page numbers or locations. The media guidance application may perform this operation by retrieving a name of the print media (a name of the newspaper) and date and search a database using these terms for retrieving the list of content in the print media. The media guidance application may identify from the list of content other content that is related to the first set of keywords. For example, the media guidance application may identify another article that is in the print media that relates to the article about the New York Knicks v. Chicago Bulls game. The media guidance application may determine that the other content is located in a second page of the print media. For example, the media guidance application may determine that the other article is on page 6 while the user is currently viewing page 2 of the print media. The media guidance application may provide as the supplemental content the other content and a reference to the second page of the print media (e.g., page 6). For example, the media guidance application may retrieve some or all of the portions of the related article from page 6 for presentation together with the article about the New York Knicks v. Chicago Bulls game that is on page 2. The media guidance application may present an indication that the related article came from page 6 of the print media.

In some embodiments, the media guidance application may replace a portion of the article that is of interest to the user based on a current location of the user. For example, if the user is browsing a newspaper from Palm Beach County in New York, the media guidance application may replace geographically specific information about Palm Beach County with information about New York. For example, the media guidance application may determine the user is interested in the weather section of the newspaper. But the media guidance application may determine that the user is currently in New York and that the weather section pertains to Palm Beach County. In such circumstances, the media guidance application may replace the weather information presented about Palm Beach County with weather information local to the user in New York. In particular, the media guidance application may determine that the print media is associated with a first geographical location. For example, the media guidance application may identify a title of the print media and determine based on words in the title (e.g., Palm Beach Post) that the print media relates to a first geographical location (e.g., Palm Beach). The media guidance application may determine that the first set of keywords associated with the first portion are associated with the first geographical location. For example, the media guidance application may detect weather information in the first article about weather that is related to the location Palm Beach. The media guidance application may detect that the user is currently in a second geographical location. For example, the media guidance application may obtain GPS information from the augmented reality device the user is using and determine that the location (e.g., New York) corresponding to the obtained GPS information does not match the location associated with the first set of keywords (e.g., Palm Beach). The media guidance application may identify subject matter related to the first set of keywords. For example, the media guidance application may identify that the first set of keywords include weather information. In response, the media guidance application may retrieve content associated with the subject matter and the second geographical location. For example, the media guidance application may search a weather database for weather information corresponding to the user's location (e.g., New York). The media guidance application may generate for display using the augmented reality device the retrieved content in the first portion replacing at least a portion of information in the first portion. For example, the media guidance application may replace temperature specified in the first portion of the print media relating to the Palm Beach location with temperature information local to the user (e.g., New York temperature).

In some embodiments, the media guidance application may provide the user with a magnified version of content in the print media the user is reading using the augmented reality device. In such circumstances, the magnified version may be positioned at a current reading location in the first portion may obscure some content that is in the first portion or may be presented in the second portion that is not of interest to the user. In particular, the media guidance application may detect a digit of the user positioned over the first portion. For example, the media guidance application may detect the user's finger is pointing to a word or section in the first portion. In response, the media guidance application may enhance the region pointed at by the user's finger by magnifying the content in that portion. The media guidance application may capture an image within an area of where the user is pointing their finger and locally digitally magnify the content in the image. Alternatively, the media guidance application may retrieve from a remote database a magnified version of the entire portion the user is pointing their finger at and present the retrieved magnified version alongside or on top of the portion over which the user's finger is positioned.

In some embodiments, the media guidance application may identify symbols in a given portion of the print media that reference a specific remote database or website from which to retrieve supplemental content. In such circumstances, in addition to or alternative to retrieving supplemental content based on keywords and/or geographical location, the media guidance application may process the symbol and retrieve content specifically referenced by the symbol. For example, the media guidance application may detect a QR code in the first portion of the print media. The media guidance application may capture an image of the QR code and obtain supplemental content from a server based on information obtained from the QR code. For example, the QR code may reference a particular website and in such cases, the media guidance application may access the website referenced by the QR code and obtain an image of the website as the supplemental content for display in augmented reality over another portion of the print media.

In some embodiments, the media guidance application may position a display of the supplemental content using the augmented reality device over the second portion of the print media. For example, the media guidance application may present some or all of the identified supplemental content over the politics article of the newspaper page the user is reading using the augmented reality device. As the user is reading the newspaper page and viewing the page through the augmented reality device, portions of the page that are not of interest to the user (e.g., politics) are replaced and appear to have content related to portions that are of interest to the user (e.g., sports). In particular, as the user is reading an article about the New York Knicks v. Chicago Bulls game in the newspaper page, the media guidance application may replace a politics article in the page with pictures, comments, videos or other related content pertaining to the New York Knicks v. Chicago Bulls game.

In some implementations, the media guidance application may automatically obtain the supplemental content in response to determining that a gaze of the user through the augmented reality device is focused on the first portion. For example, the media guidance application may use a camera to analyze a position of the user's eyes relative to the print media. In response to detecting that the user's eyes are positioned over the first portion, the media guidance application may automatically retrieve and present the supplemental content.

These unconventional ways to present supplemental content for sections of print media the user is reading provide a non-intrusive, non-distracting, and a more efficient use of space in augmented reality than conventional systems. Particularly, the augmented reality technology allows for much more content to be simultaneously provided to a user in different forms but in doing so introduces the problem of distracting and confusing users of such systems. Conventional systems simply ignore this problem and blindly present the additional content in the augmented reality in ways that confuse the user and block content the user is actually trying to consume. Embodiments of this disclosure provide particular ways to address the problem of presenting the supplemental content in augmented reality for print media the user is consuming by intelligently selecting when and where to present the content in ways that do not distract or confuse the user. The unconventional way in which the present disclosure addresses the particular problem arising out of the augmented reality space is to identify which sections of the print media within the augmented reality view are not of interest to the user and presenting the content, related to sections of the print media that are of interest, in those uninteresting sections.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7 is a flowchart representing a process for enhancing print media with an augmented reality device in accordance with some embodiments of the disclosure;

FIG. 11 is a flowchart representing a process for searching a database based on a set of keywords from print media in accordance with some embodiments of the disclosure.

DETAILED DESCRIPTION

Figure 1:
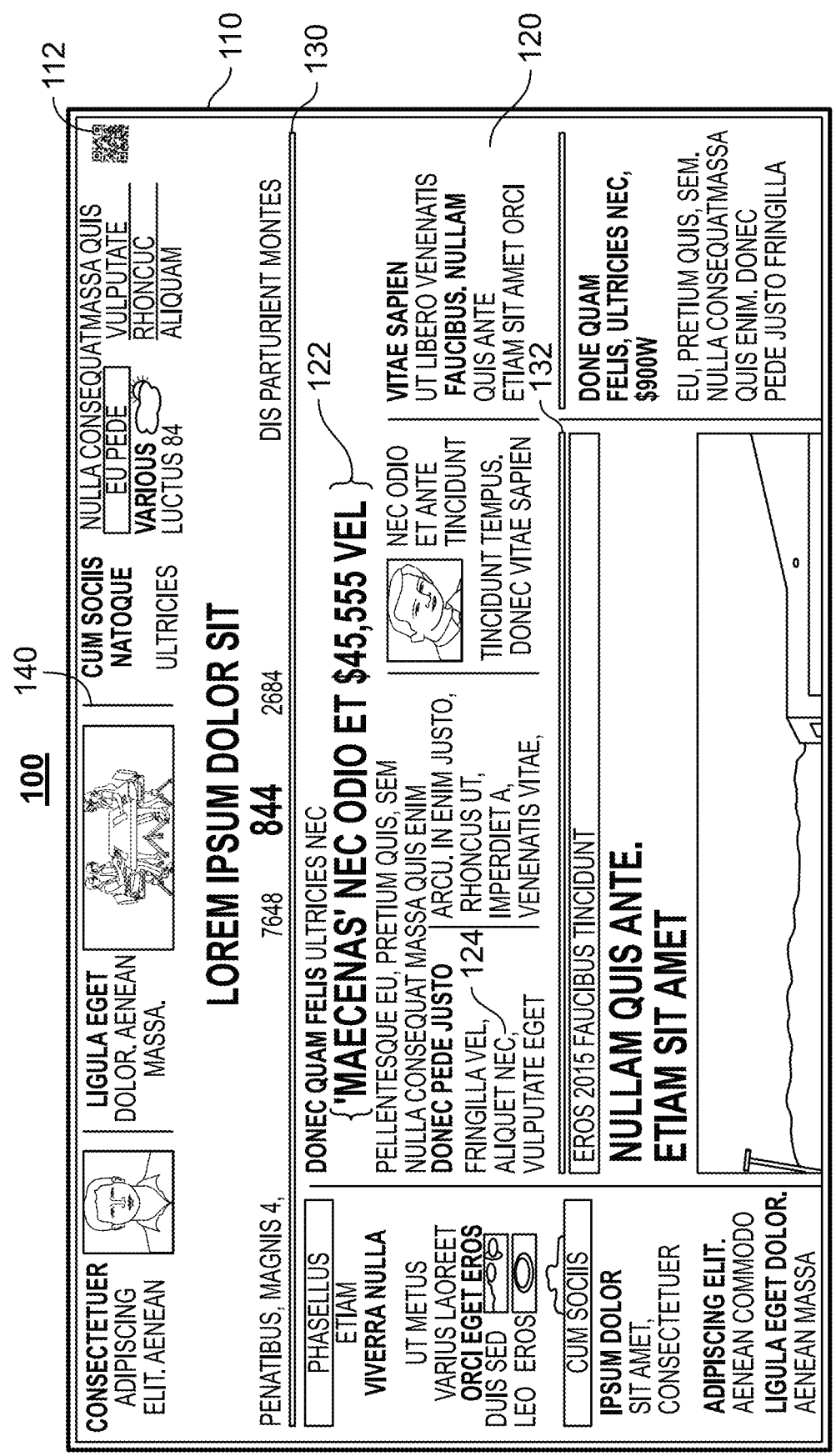
FIG. 1 shows an exemplary print media in accordance with some embodiments of the disclosure.

Accordingly, systems and methods are provided for displaying supplemental content for print media using augmented reality. In particular, systems and methods are provided for intelligently positioning augmented reality content related to print media over portions of the print media that are not of interest to the user. For example, a user may browse a physical copy of print media, such as a newspaper, while using an augmented reality device, such as augmented reality goggles. The system may identify different sections of a page the user is currently reading. For example, the system may identify different articles, one pertaining to sports and another to politics. The system may determine which sections contain content that is of interest to the user and which sections do not. For example, the system may determine the user likes the sports section but not the politics section of the page. The system may identify and retrieve content related to the sports column, which the user is interested in, such as video highlights and pictures of the sport featured in the column. The system may then present the content related to the sports column over the politics section in the augmented reality device so that none of the sections of interest to the user (e.g., the sports column content) is blocked from view.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

FIG. 1 shows an exemplary print media 100 in accordance with some embodiments of the disclosure. Print media 100 may include any physical document that contains media or information. For example, print media 100 may include a newspaper, magazine, comic book, books, text books, articles, journals, etc. Print media 100 may include multiple sections, each with a different article or column. A page of print media 100 may include any number of different portions, segments, articles or snippets each pertaining to the same or a different topic, category or subject matter. For example, print media 100 includes a first portion 110 and second portion 120. First portion 110 may include an article or snippet about the weather and second portion 120 may include an article or snippet about politics.

In some embodiments, a media guidance application (implemented at least partially on an augmented reality device) may detect that the user is currently reading or viewing print media 100. In response, the media guidance application may determine a user profile for a user of the augmented reality device. For example, the media guidance application may listen to the user's voice, capture a fingerprint or retina scan, determine a size of the user's head, or request a user's login information to determine who the user is that is using the augmented reality device. The media guidance application may obtain any combination of these unique user inputs and search a database to determine an identity of the user. For example, the media guidance application may search a voice recognition database for a voice signature that matches a snippet of the user's voice. Once the voice signature is found, a user identity associated with the voice signature may be retrieved.

After confirming or obtaining the user's identity, the media guidance application may search an online or local database for a profile associated with the user. For example, the media guidance application may transmit a query to a profile database with the user's name or other form of identity to retrieve a profile associated with that identity. The profile may specify one or more attributes that are of interest and that are not of interest to the user. For example, the user profile may specify that the user likes to consume content about weather and sports but not about politics. The attributes may also specify levels of interest in each or some of the attributes. In some implementations, the profile may be dynamically updated automatically by the media guidance application to reflect current user interests and/or may be manually populated by the user. In some circumstances, the media guidance application may present a series of questions to the user and, based on responses, the media guidance application may generate a profile for the user. In some circumstances, the media guidance application may present a list of attributes and receive user input specifying a level of like or dislike for each attribute.

The media guidance application may process an area of print media 100 to identify first and second portions 110 and 120 of print media 100 within the area. For example, the media guidance application may capture an image of a page that the user is currently reading of the newspaper to identify different articles in the page. In some implementations, the media guidance application may send the captured image to a local or remote image processing engine. The image processing engine may be a dedicated hardware device for performing image processing or may be a general purpose processor (GPU) programmed to execute an image processing algorithm. The image processing engine may analyze the image to detect an object 130 separating a first collection of text from a second collection of text. For example, the image processing engine may identify where text is on the newspaper page that is completely or partially bordered by horizontal or vertical bars or lines. Each area of text that is bordered partially or completely by the bars or lines may be defined as a different collection of text. The image processing engine may determine whether the first and second collections of text include respective headings 122. For example, the image processing engine may analyze the fonts in each collection of text to determine whether there are different sized fonts. In response to detecting that a given collection of text has a majority of text in a font of a threshold size that is less than a font size of other text in the same collection, the image processing engine may associate the given collection of text with one article in the page. Particularly, the image processing engine may label or store an indication that the given collection pertains to the same article in the page. Similarly, in response to detecting that the second collection of text has a majority of text in a font of a threshold size that is less than a font size of other text in the second collection, the image processing engine may associate the second collection of text with a second article in the page. Particularly, the image processing engine may label or store an indication that the second collection pertains to the second article in the page.

For example, an image of print media 100 may be captured and sent to a local or remote image processing engine. The image processing engine may identify a collection of text 124 that is the same size. The image processing engine may determine a size of text 124 and compare that size to a size of heading 122. In response to determining that the size of text 124 is more than a threshold amount (more than 50 percent) smaller than the size of text 124 and that text 124 is immediately adjacent (e.g., under or to the side of) heading 122, the image processing engine may determine that text 124 includes content that is associated with heading 122. In addition, the image processing engine may identify objects 130 and 132 as objects that are adjacent to and border a region that includes heading 122 and text 124. In response to identifying objects 130 and 132, the image processing engine may determine that the content bordered by these objects corresponds to a same article (e.g., the article having a heading "University brings $26,000 bill"). The image processing engine may compute a size of every text font that appears in the image of print media 100. The image processing engine may compare the sizes of every text font and may determine a largest size of the text font. The image processing engine may determine that the text with the largest font size is a title of print media 100. The image processing engine may similarly process other regions of the image of print media 100 to identify second portion 110 and other portions. For example, the image processing engine may determine that the word "WEATHER" is in a larger font size than the word "MONDAY" that is adjacent to the word "WEATHER" in a section of the image of print media 100. Also, a border 140 is adjacent to both of the words. Accordingly, image processing engine may determine that the content adjacent to border 140 including the words "WEATHER" and "MONDAY" corresponds to the same article about weather.

In some cases, the image processing engine may also detect an electronic reference object 112 (e.g., a QR code) in a portion of print media 100. For example, the image processing engine may detect object 112 in second portion 110 and may associate that reference with that portion for subsequent retrieval of supplemental information.

In some embodiments, the media guidance application may generate a first set of keywords associated with the first portion and a second set of keywords associated with the second portion. For example, the media guidance application may search text in the first article and text in the second article of the newspaper page to select nouns, verbs and predetermined words. For example, the media guidance application may select the words weather, rain, and palm beach from portion 110 and the words university, trump, and politics from second portion 120.

The media guidance application may store the selected nouns, verbs and predetermined words that appear in the text of the first article as a first set of keywords that identify the first article. The media guidance application may search an online or local database using some or all of the selected words to identify and retrieve related words to add to the first set of keywords. The media guidance application may perform a similar analysis and word selection for each other article on the page to generate second, third and fourth sets of keywords. The media guidance application may generate characteristics that represent each of the sets of keywords and may compare the characteristics to the attributes stored in the user profile. For example, the media guidance application may generate a characteristic of weather for first portion 110 and a characteristic of politics for second portion 120.

The media guidance application may determine, based on comparing the keywords and/or their characteristics to the user profile, that the first portion of the print media matches the user profile and the second portion of the print media does not match the user profile. For example, the media guidance application may generate a characterization of the first article (the first portion) that identifies the first article as being related to sports, and the media guidance application may generate a characterization of the second article (the second portion) that identifies the second article as being related to politics. The media guidance application may compare the characterizations to the user profile to determine that, because the user profile specifies the user likes sports but not politics, the first article matches the user profile and the second article does not.

The media guidance application may search a database based on the first set of keywords to obtain supplemental content related to the first portion of the print media. For example, the media guidance application may select the sports article of the newspaper that matches the user profile for searching for supplemental content or content related to the selected article. The media guidance application may search one or more websites, social networks, or remote databases for content having metadata that matches a threshold number of the first set of keywords of the sports article. For example, if the sports article is about the New York Knicks v. Chicago Bulls game, the media guidance application may search a sports source (e.g., ESPN) for updated standings, photographs, and videos related to the game and/or may search a social network associated with the user for posts or comments about the game submitted by other users. Any matching content may be selected as the supplemental content related to the article. The media guidance application may search metadata of media generated by the user (e.g., a user's photographs stored on the user's mobile phone) to identify metadata that relates to the game. For example, the media guidance application may identify a time period associated with the game and a location and may determine whether any photographs stored on the user's phone are associated with metadata that matches the time period and location of the game. In particular, the user may have attended the game and taken pictures of the game. Each picture may be geo-tagged using GPS with the game's location and may be associated with a date and time of the game. As a result, the pictures may match the game's time period and location and may be selected as being related to the game for use as the supplemental content.

There are many different ways for the media guidance application to identify supplemental content. In some implementations, the media guidance application may determine that a keyword of the first set of keywords relates to a geographical area. For example, the media guidance application may determine that the sports article about the New York Knicks v. Chicago Bulls game relates to the Chicago area because the title of the game indicates that the New York Knicks were playing or visiting the Chicago Bulls, who are located in the Chicago area. The media guidance application may access a database of a collection of media assets generated by the user. For example, the media guidance application may access a remote storage (e.g., iCloud drive) of the user to identify a set of pictures and videos the user has taken in the past. The media guidance application may retrieve metadata associated with the collection of media assets. For example, the media guidance application may retrieve GPS information for each media asset in the collection. The media guidance application may identify a given media asset associated with metadata that matches the geographical location by determining that the GPS information corresponds to a location that is within a threshold range of the Chicago area. In response to identifying that the given media asset corresponds to the geographical area of the first set of keywords, the media guidance application may select that given media asset as the supplemental content for the article about New York Knicks v. Chicago Bulls game.

In some embodiments, the media guidance application may identify a plurality of media assets associated with the geographical area of the sports article. Some of the media assets may be generated by the user (e.g., stored on the remote or local storage of the user) and some may be generated by other users or other content sources. The media guidance application may add the plurality of media assets and the given media asset to a playlist and may provide the playlist as the supplemental content. The playlist may represent an ordered list of media assets that are presented simultaneously or in a given sequence to a user automatically.

In some embodiments, the first and second portions of the print media may be in a first page of the print media. In such circumstances, the media guidance application may access from a database a list of content in the print media. For example, the media guidance application may retrieve from a database a list of all of the articles that are in the print media and their respective page numbers or locations. The media guidance application may perform this operation by retrieving a name of the print media (a name of the newspaper) and date and search a database using these terms for retrieving the list of content in the print media. The media guidance application may identify from the list of content other content that is related to the first set of keywords. For example, the media guidance application may identify another article that is in the print media that relates to the article about the New York Knicks v. Chicago Bulls game. The media guidance application may determine that the other content is located in a second page of the print media. For example, the media guidance application may determine that the another article is on page 6 while the user is currently viewing page 2 of the print media. The media guidance application may provide as the supplemental content the other content and a reference to the second page of the print media (e.g., page 6). For example, the media guidance application may retrieve some or all of the portions of the related article from page 6 for presentation together with the article about the New York Knicks v. Chicago Bulls game that is on page 2. The media guidance application may present an indication that the related article came from page 6 of the print media.

In some embodiments, the media guidance application may replace a portion of the article that is of interest to the user based on a current location of the user. For example, if the user is browsing a newspaper from Palm Beach County in New York, the media guidance application may replace geographically specific information about Palm Beach County with information about New York. For example, the media guidance application may determine the user is interested in the weather section of the newspaper. But the media guidance application may determine that the user is currently in New York and that the weather section pertains to Palm Beach County. In such circumstances, the media guidance application may replace the weather information presented about Palm Beach County with weather information local to the user in New York. In particular, the media guidance application may determine that the print media is associated with a first geographical location. For example, the media guidance application may identify a title of the print media and determine based on words in the title (e.g., Palm Beach Post) that the print media relates to a first geographical location (e.g., Palm Beach). The media guidance application may determine that the first set of keywords associated with the first portion are associated with the first geographical location. For example, the media guidance application may detect weather information in the first article about weather that is related to the location Palm Beach. The media guidance application may detect that the user is currently in a second geographical location. For example, the media guidance application may obtain GPS information from the augmented reality device the user is using and determine that the location (e.g., New York) corresponding to the obtained GPS information does not match the location associated with the first set of keywords (e.g., Palm Beach). The media guidance application may identify subject matter related to the first set of keywords. For example, the media guidance application may identify that the first set of keywords include weather information. In response, the media guidance application may retrieve content associated with the subject matter and the second geographical location. For example, the media guidance application may search a weather database for weather information corresponding to the user's location (e.g., New York). The media guidance application may generate for display using the augmented reality device the retrieved content in the first portion replacing at least a portion of information in the first portion. For example, the media guidance application may replace the temperature information specified in the first portion of the print media relating to the Palm Beach location with temperature information local to the user (e.g., New York temperature).

In some embodiments, the media guidance application may provide the user with a magnified version of content in the print media the user is reading using the augmented reality device. In such circumstances, the magnified version may be positioned at a current reading location in the first portion which may obscure some content that is in the first portion or may be presented in the second portion that is not of interest to the user. In particular, the media guidance application may detect a digit of the user positioned over the first portion. For example, the media guidance application may detect the user's finger is pointing to a word or section in the first portion. In response, the media guidance application may enhance the region pointed at by the user's finger by magnifying the content in that portion. The media guidance application may capture an image within an area of where the user is pointing their finger and locally digitally magnify the content in the image. Alternatively, the media guidance application may retrieve from a remote database a magnified version of the entire portion the user is pointing their finger at and present the retrieved magnified version alongside or on top of the portion over which the user's finger is positioned.

In some embodiments, the media guidance application may identify symbols in a given portion of the print media that reference a specific remote database or website from which to retrieve supplemental content. In such circumstances, in addition to or alternative to retrieving supplemental content based on keywords and/or geographical location, the media guidance application may process the symbol and retrieve content specifically referenced by the symbol. For example, the media guidance application may detect a QR code in the first portion of the print media. The media guidance application may capture an image of the QR code and obtain supplemental content from a server based on information obtained from the QR code. For example, the QR code may reference a particular website and in such cases, the media guidance application may access the website referenced by the QR code and obtain an image of the website as the supplemental content for display in augmented reality over another portion of the print media.

Figure 2:
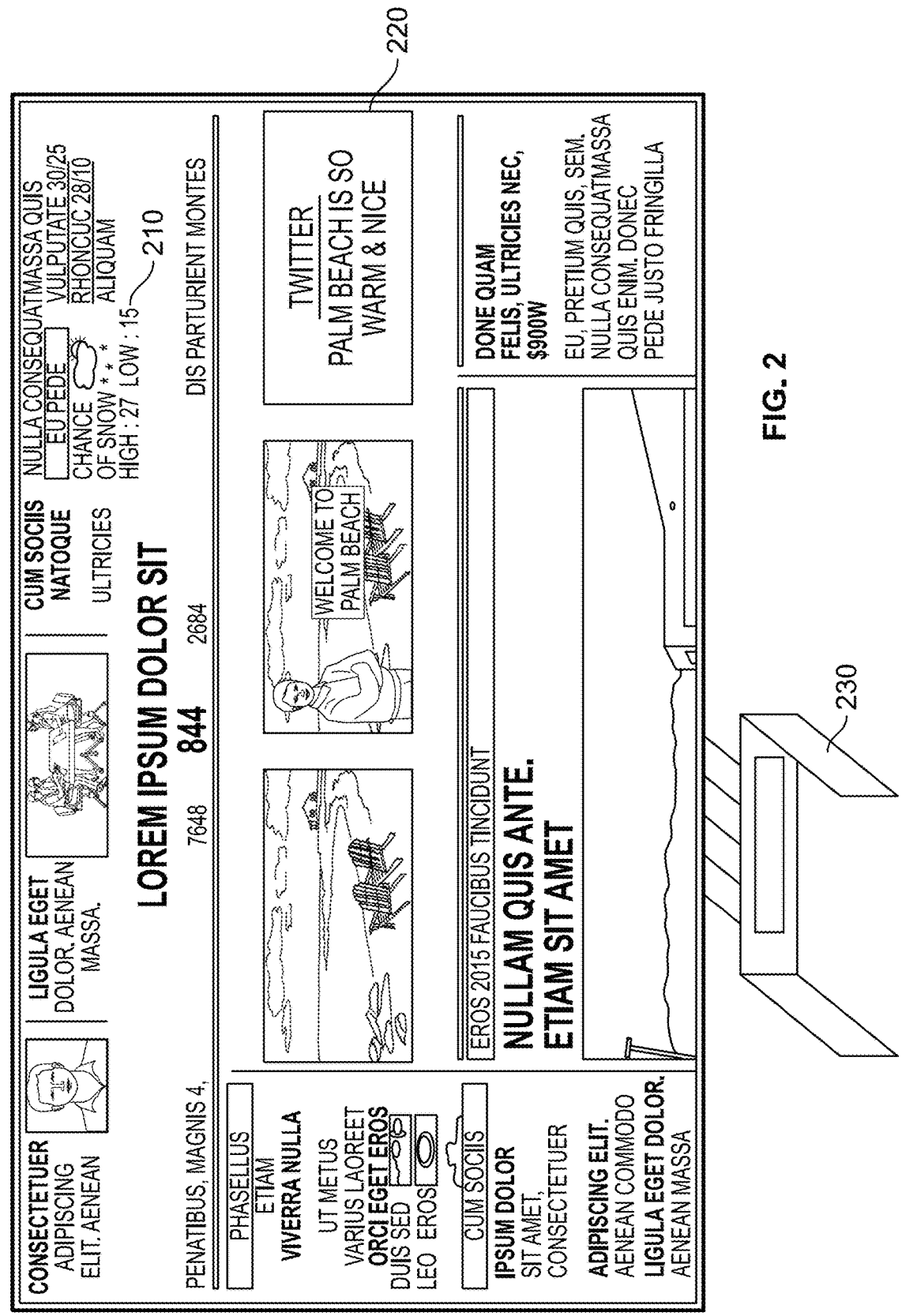
FIG. 2 shows an exemplary print media enhanced using augmented reality in accordance with some embodiments of the disclosure.

In some embodiments, the media guidance application may position a display of the supplemental content using the augmented reality device over the second portion of the print media. FIG. 2 shows an exemplary print media 200 enhanced using augmented reality in accordance with some embodiments of the disclosure. Specifically, a user may wear or use an augmented reality device 230 to view print media 200. Print media 200 may be the same as print media 100 but is shown from the view of augmented reality device 230. In particular, print media 200 represents how print media 100 is modified using augmented reality via device 230.

In some embodiments, the media guidance application may determine that portion 120 (FIG. 1) includes content that does not match a user profile and that portion 110 includes content that matches the user profile. When print media 100 is viewed through augmented reality device 230, the media guidance application replaces content shown in portion 120 with supplemental content 220 related to portion 110.

For example, the media guidance application may present some or all of the identified supplemental content over the politics article portion 120 of the newspaper page the user is reading using the augmented reality device. As the user is reading the newspaper page and viewing the page through the augmented reality device, portions of the page that are not of interest to the user (e.g., politics) are replaced and appear to have content related to portions that are of interest to the user (e.g., sports). In particular, as the user is reading an article about the New York Knicks v. Chicago Bulls game in the newspaper page, the media guidance application may replace a politics article in the page with pictures, comments, videos or other related content pertaining to the New York Knicks v. Chicago Bulls game.

In some implementations, the media guidance application replaces portions of portion 110 that relate to a geographic location that is not the current geographic location of the user with content 210 specific to the user's current geographic location. For example, portion 110 may be determined to relate to weather specific to Palm Beach (e.g., rain with a high of 77 and a low of 65). The media guidance application may determine that device 230 is currently in a New York region based on GPS information of device 230. Accordingly, the media guidance application may replace the weather information in portion 110 with local weather information. Specifically, the media guidance application may access a weather database and retrieve weather specific to the user's current GPS location as determined from device 230. The media guidance application may present local information (e.g., snow with a high of 27 and low of 15) in place of the weather information associated with the printed media. Accordingly, the media guidance application dynamically updates, using augmented reality, static portions of the printed media with information local to the user.

In some implementations, the media guidance application may automatically obtain the supplemental content in response to determining that a gaze of the user through the augmented reality device is focused on the first portion. For example, the media guidance application may use a camera to analyze a position of the user's eyes relative to the print media. In response to detecting that the user's eyes are positioned over the first portion, the media guidance application may automatically retrieve and present the supplemental content.

Figure 3:
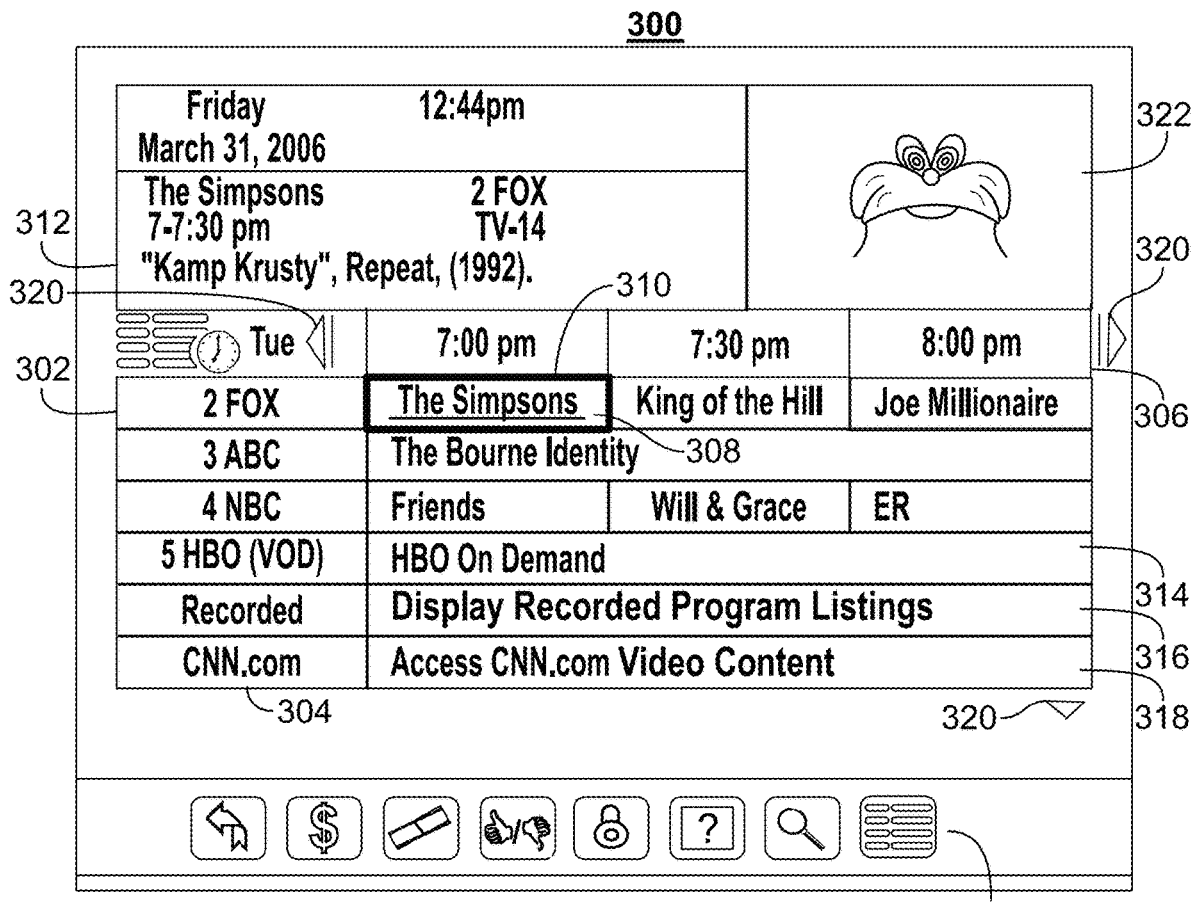
FIG. 3 shows an illustrative display screen that may be used to provide media guidance data in accordance with some embodiments of the disclosure.
Figure 4:
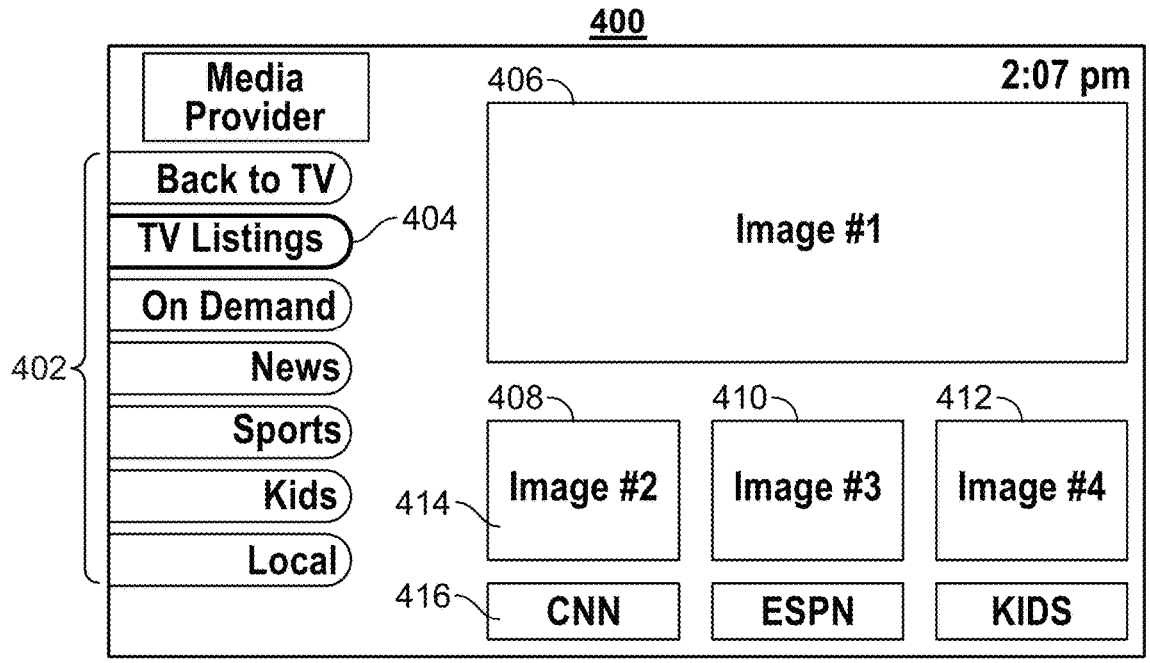
FIG. 4 shows an illustrative display screen that may be used to provide media guidance data in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
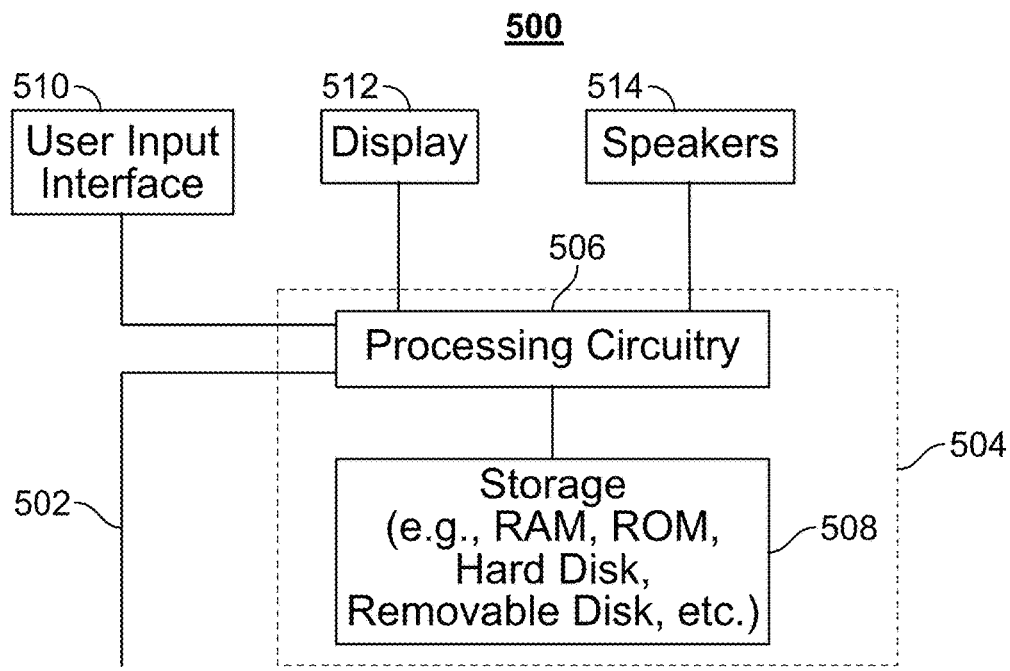
FIG. 5 shows a generalized embodiment of a device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
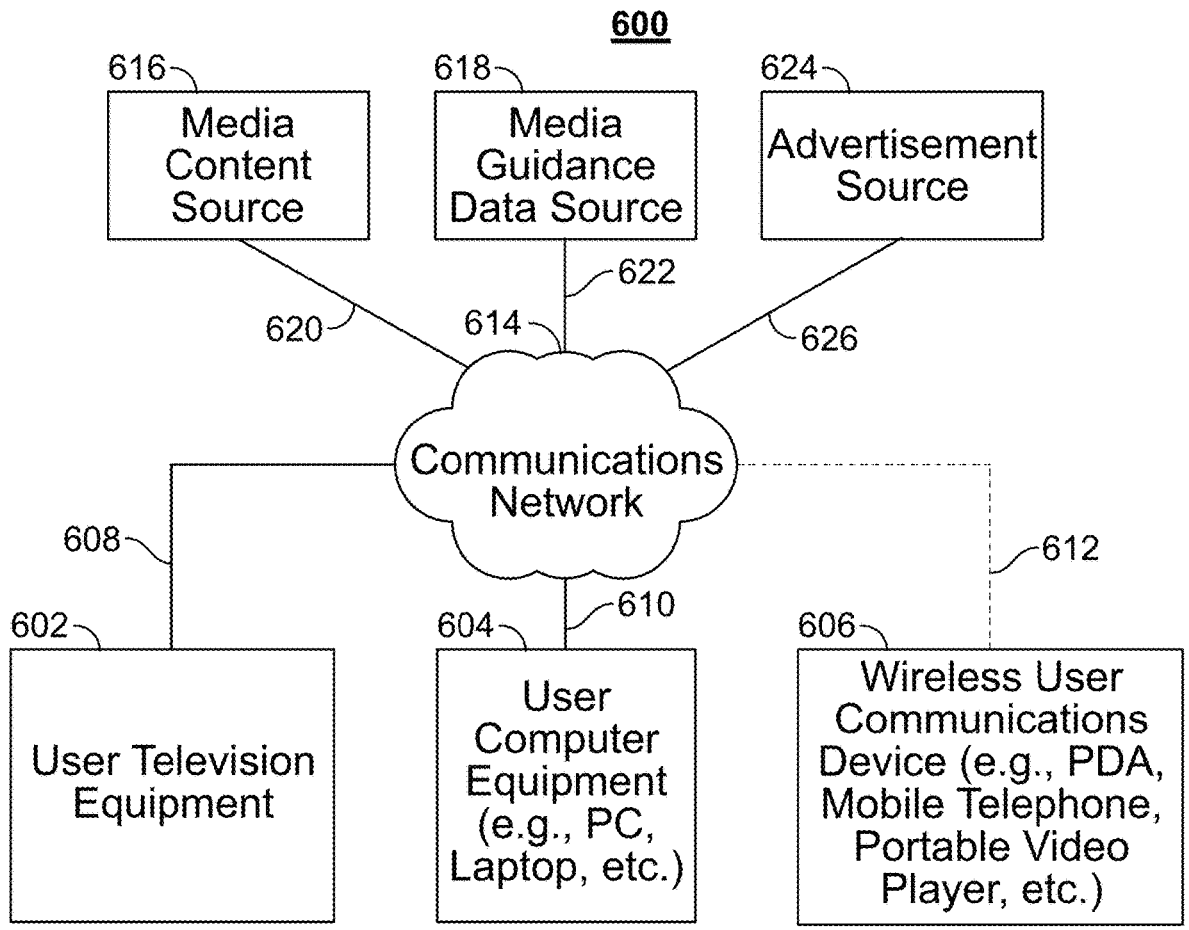
FIG. 6 shows a specific implementation of user devices in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

A user equipment device utilizing at least some of the system features described above in connection with FIG. 5 may also be characterized as and embodied in an augmented reality device. Augmented reality devices may take various forms. For example, an augmented reality device may be a pair of goggles worn by a user. The goggles capture real world surroundings of the user that are within a field of view and supplement or augment those surroundings with digital material that can only be seen in a display of the goggles and not in the real world. The goggles may include a screen that digitally replicates what a user is looking at and enhances the real world surroundings with digital content. For example, a user may look through the goggles at a real world building and the goggles may add a name to the building so it appears to the user as if the name is on the building in real life but the name can only be seen through the goggles. Another implementation of augmented reality devices can be in a mobile phone with a screen. A user may hold the phone and position the phone over a real world object (e.g., a newspaper) and the screen of the phone shows the real world object and adds digital material that can only be seen on the screen of the phone. In particular, a camera of the phone captures the real world surroundings at which the phone is positioned over and the processor of the phone displays the real world surroundings in the screen of the phone and enhances those surroundings with digital content. For example, the phone may capture an image of a newspaper the user is reading and may replace one of the portions of the newspapers (e.g., an article that is not of interest to the user) with supplemental content that relates to another portion (e.g., an article that is of interest to the user).

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11×, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

FIG. 7 is a flowchart of a detailed illustrative process for enhancing print media with an augmented reality device in accordance with some embodiments of the disclosure. It should be noted that process 700 or any step thereof could be performed on, or provided by, any of the devices shown in FIGS. 5-6. For example, process 700 may be executed by control circuitry 504 (FIG. 5) as instructed by a media guidance application implemented on a user device (e.g., augmented reality device embodied in user equipment devices 602, 604, and/or 606 (FIG. 6)) in order to enhance print media with supplemental content. In addition, one or more steps of process 700 may be incorporated into or combined with one or more steps of any other process or embodiment (e.g., as described in relation to FIGS. 1, 2, and 7-12).

At step 710, a user profile for a user of an augmented reality device is determined. For example, control circuitry 504 may detect that a user is using augmented reality device 230 to view print media 200. In response, control circuitry 504 may capture a fingerprint, retina image, distance between the eyes/ears, request login information or perform any other process that enables control circuitry 504 to uniquely identify the user of device 230. Control circuitry 504 may query a profile database using some or all of the identity information captured from the user to retrieve a profile for the user. The profile may specify preferences and levels of interest the user has in one or more attributes.

At step 720, content of the print media is searched to identify a first portion of the print media that matches the user profile and a second portion of the print media that does not match the user profile. For example, control circuitry 504 may perform image processing on a page of print media 200 being viewed by the user to identify which portions correspond to different articles. For example, control circuitry 504 may determine that first portion 110 corresponds to an article about weather and that second portion 120 corresponds to an article about politics. Control circuitry 504 may determine from the retrieved profile that the user prefers weather over sports and in response may identify that first portion 110 matches the user profile and second portion 120 does not match the user profile.

At step 730, supplemental content is obtained based on content of the first portion of the print media. For example, control circuitry 504 may determine that first portion 110 represents weather information about a city called Palm Beach. In response, control circuitry 504 may search for supplemental content about the weather in Palm Beach and/or supplemental content about the city itself. For example, control circuitry 504 may retrieve media (e.g., pictures and/videos) generated by the user when the user visited the city of Palm Beach, posts or comments made by the user's friends relating to the city of Palm Beach, up-to-date or real-time information about events (e.g., sporting events) or teams from that region. To do so, control circuitry 504 may transmit an identifier of the user and a keyword from first portion 110 (e.g., the name of the city Palm Beach) to a local or remote database to obtain media related to first portion 110.

At step 740, a display of the supplemental content is positioned over the second portion of the print media. For example, control circuitry 504 may replace all or some of the content/images in second portion 120 with the supplemental content retrieved that relates to first portion 110. For example, control circuitry 504 may present media 220 or a playlist of content in place of the content that is in second portion 120. This media 220 may include pictures taken by the user when the user visited the city mentioned in first portion 110, posts or comments made by friends of the user on a social network about the city and/or any other supplemental content discussed above. Media 220 that replaces the content in second portion 120 can only be seen through augmented reality device 230, and to another user who is not viewing print media 200 through device 230, print media 200 looks like print media 100 where none of the content on the print media is modified.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 7.

Figure 8:
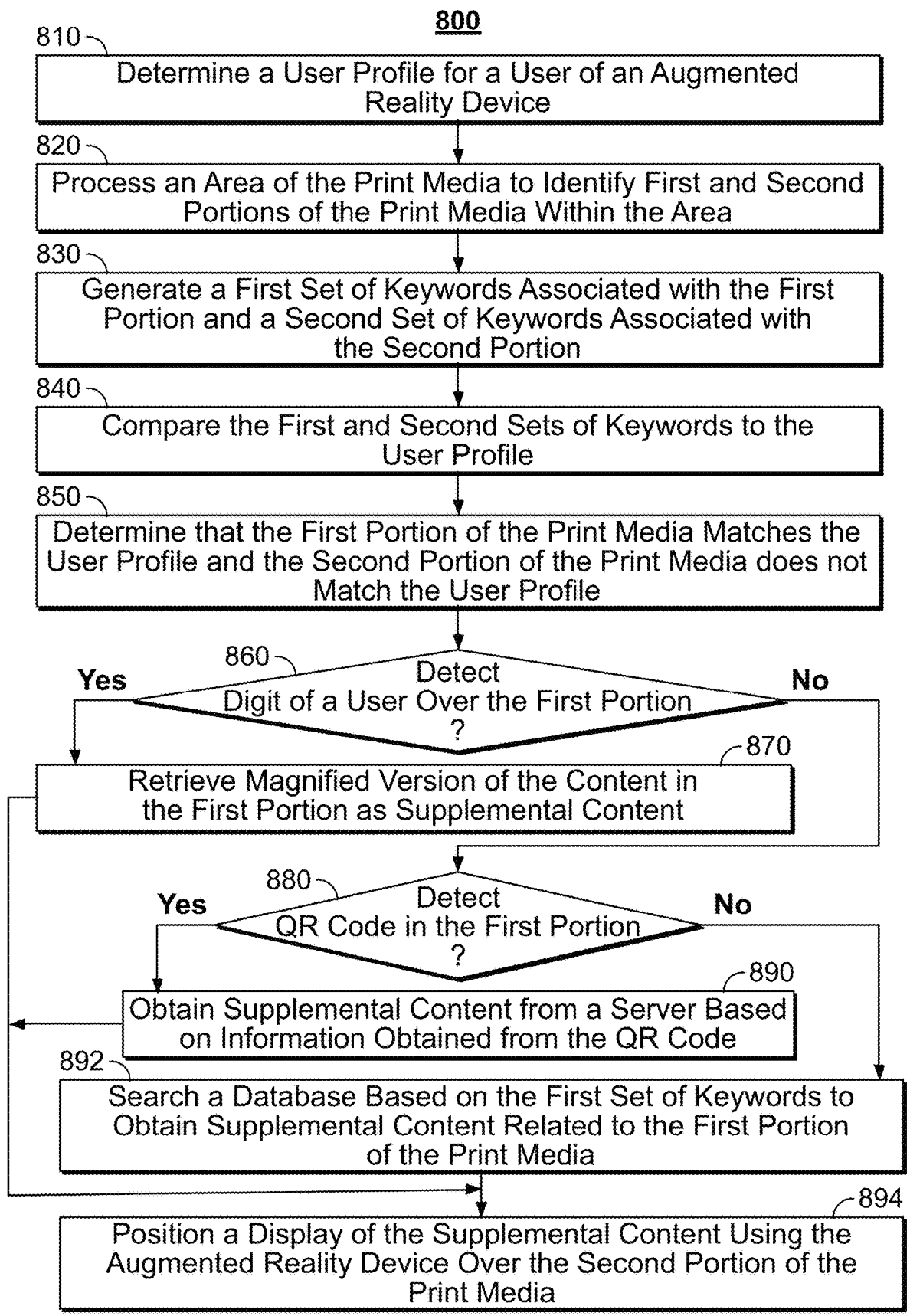
FIG. 8 is a flowchart representing a process for enhancing print media with an augmented reality device in accordance with some embodiments of the disclosure.

FIG. 8 is a flowchart of a detailed illustrative process for enhancing print media with an augmented reality device in accordance with some embodiments of the disclosure. It should be noted that process 800 or any step thereof could be performed on, or provided by, any of the devices shown in FIGS. 5-6. For example, process 800 may be executed by control circuitry 504 (FIG. 5) as instructed by a media guidance application implemented on a user device (e.g., augmented reality device embodied in user equipment devices 602, 604, and/or 606 (FIG. 6)) in order to enhance print media with supplemental content. In addition, one or more steps of process 800 may be incorporated into or combined with one or more steps of any other process or embodiment (e.g., as described in relation to FIGS. 1, 2, and 7-12).

At step 810, a user profile for a user of an augmented reality device is determined. For example, control circuitry 504 may detect that a user is using augmented reality device 230 to view print media 200. In response, control circuitry 504 may capture a fingerprint, retina image, distance between the eyes/ears, request login information or perform any other process that enables control circuitry 504 to uniquely identify the user of device 230. Control circuitry 504 may query a profile database using some or all of the identity information captured from the user to retrieve a profile for the user. The profile may specify preferences and levels of interest the user has in one or more attributes.

At step 820, an area of the print media is processed to identify first and second portions of the print media within the area. For example, control circuitry 504 may capture an image of print media 100 and send the image to an image processing engine to identify which portions correspond to articles. The image processing engine may use edge detection and text analysis to determine where borders and objects exist that separate different collections of text and where headings exist. After identifying different collections of text representing different articles, the image processing engine may return to control circuitry 504 an identification of the location and borders of first portion 110 and second portion 120. Using the location and borders, control circuitry 504 may ensure that supplemental content is only contained within a region corresponding to a given portion and does not overlap with any other region.

At step 830, a first set of keywords associated with the first portion and a second set of keywords associated with the second portion are generated. For example, the image processing engine may return to control circuitry 504 the text of each portion. The image processing engine may perform automatic character recognition to obtain a digital representation of the text contained in each portion. Control circuitry 504 may select nouns, pronouns, verbs, predetermined words, etc. from each portion to generate first and second sets of keywords for respective first and second portions 110 and 120.

At step 840, the first and second sets of keywords are compared to the user profile. Control circuitry 504 may compute one or more characterizations of the keywords in the first and second sets of keywords. For example, control circuitry 504 may transmit the keywords in the first set of keywords to a database and receive one or more characterizations of the text. For example, the first set of keywords may include the words weather, Palm Beach, and rain and the database may determine these words are all associated with weather. Accordingly, the database may characterize the first set of words with weather. A similar analysis may be performed for the second set of keywords to determine that these keywords are characterized as politics. Control circuitry 504 may compare the characterizations of the sets of keywords with the profile to determine which sets of keywords match the attributes in the profile.

At step 850, a determination is made that the first portion of the print media matches the user profile and the second portion of the print media does not match the user profile. For example, in response to determining that the first set of keywords matches the profile, control circuitry 504 may determine that the first portion matches the profile and in response to determining that the second set of keywords does not match the profile, control circuitry 504 may determine that the second portion does not match the profile.

At step 860, a determination is made as to whether a digit of a user is positioned over the first portion. In response to determining that the digit is positioned over the first portion, the process proceeds to step 870, otherwise the process proceeds to step 880. For example, control circuitry 504 may detect a user's finger in the view of augmented reality device 230. Control circuitry 504 may compute a distance between the finger and the first/second portion of print media 200. In response to determining that a distance between the finger and the first portion 110 is less than a threshold (e.g., less than 3 centimeters), control circuitry 504 may determine that the user's finger or digit is positioned over first portion 110. In some implementations, instead of a user's digit, control circuitry 504 may perform the same analysis for a stencil or stylus.

At step 870, a magnified version of the content in the first portion is retrieved as supplemental content. For example, control circuitry 504 may select a region within range of the digit or stylus or stencil of first portion 110. The region may correspond to one paragraph or a square area with a predetermined diagonal. Control circuitry 504 may identify the text contained in that area and may generate new text that is in a font size that is 2×, 3× or some predetermined or user specified value. The new text may be provided as the magnified version of the content over which the digit, stylus or stencil is positioned. Alternatively or in addition, control circuitry 504 may capture an image of the square area and transmit the image to the image processing engine to enhance the image and magnify the image by 2×, 3× or some predetermined or user specified value. These magnified portions may be provided as the supplemental content that is presented in place of first/second portions 110 and/or 120.

At step 880, a determination is made as to whether a QR code is detected in the first portion. In response to determining that QR code is detected in the first portion, the process proceeds to step 890, otherwise the process proceeds to step 892.

At step 890, supplemental content is obtained from a server based on information obtained from the QR code. For example, control circuitry 504 may process the QR code to identify a URL specified or associated with the QR code. Control circuitry 504 may access the website and obtain some or all of the content from the website as the supplemental content.

At step 892, a database is searched based on the first set of keywords to obtain supplemental content related to the first portion of the print media. For example, control circuitry 504 may transmit some or all of the keywords to a database that stores images or media generated by the user, an editor, a content source, and/or friends of the user on a social network to identify supplemental content that has metadata that matches at least one of the keywords in the first set.

At step 894, a display of the supplemental content is positioned using the augmented reality device over the second portion of the print media. For example, control circuitry 504 may replace all or some of the content/images of the supplemental content in second portion 120 with the supplemental content retrieved that relates to first portion 110. For example, control circuitry 504 may present media 220 or a playlist of content in place of the content that is in second portion 120. This media 220 may include pictures taken by the user when the user visited the city mentioned in first portion 110, posts or comments made by friends of the user on a social network about the city and/or any other supplemental content discussed above. Media 220 that replaces the content in second portion 120 can only be seen through augmented reality device 230, and to another user who is not viewing print media 200 through device 230, print media 200 looks like print media 100 where none of the content on the print media is modified.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 8.

Figure 9:
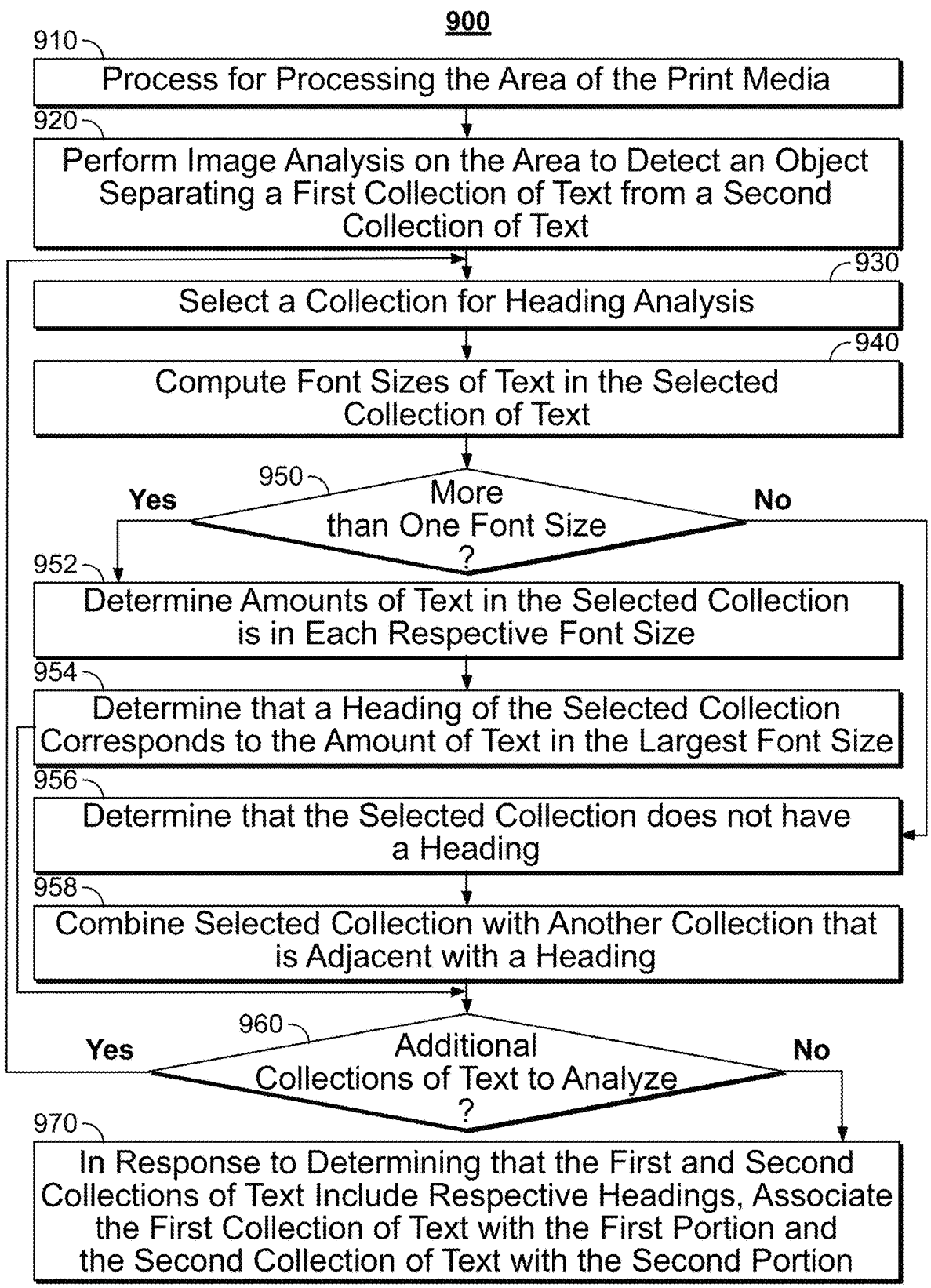
FIG. 9 is a flowchart representing a process for processing an area of print media in accordance with some embodiments of the disclosure.

FIG. 9 is a flowchart of a detailed illustrative process for processing an area of print media in accordance with some embodiments of the disclosure. It should be noted that process 900 or any step thereof could be performed on, or provided by, any of the devices shown in FIGS. 5-6. For example, process 900 may be executed by control circuitry 504 (FIG. 5) as instructed by a media guidance application implemented on a user device (e.g., augmented reality device embodied in user equipment devices 602, 604, and/or 606 (FIG. 6)) in order to process an area of print media. In addition, one or more steps of process 900 may be incorporated into or combined with one or more steps of any other process or embodiment (e.g., as described in relation to FIGS. 1, 2, and 7-12).

At step 910, the process for processing the area of the print media begins. For example, control circuitry 504 begins this process to perform step 820 (FIG. 8).

At step 920, image analysis is performed on the area to detect an object separating a first collection of text from a second collection of text. For example, an image processing engine may analyze the image of print media captured by device 230 to detect borders 130, 132 and 140 that separate different collections of text.

At step 930, a collection is selected for heading analysis. For example, the text between borders 130 and 132 is selected for heading analysis.

At step 940, font sizes of text in the selected collection of text are computed. At step 950, a determination is made as to whether more than one font size was computed in step 940. In response to determining that more than one font size was computed, the process proceeds to step 952, otherwise the process proceeds to step 956.

At step 952, amounts of text in the selected collection in each respective font size are determined.

At step 954, a determination is made that a heading of the selected collection corresponds to the amount of text in the largest font size. For example, the image processing engine may determine that heading 122 includes text that is larger in font size than any other text in the region between borders 130 and 132.

At step 956, a determination is made that the selected collection does not have a heading.

At step 958, the selected collection is combined with another collection that is adjacent with a heading. For example, the image processing engine may determine that text 124 does not include a heading and in response may combine it with nearby text including heading 122.

At step 960, a determination is made as to whether additional collections of text are left to analyze. In response to determining that additional collections remain, the process proceeds to step 930, otherwise the process proceeds to step 970.

At step 970, in response to determining that the first and second collections of text include respective headings, the first collection of text is associated with the first portion and the second collection of text is associated with the second portion.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 9.

Figure 10:
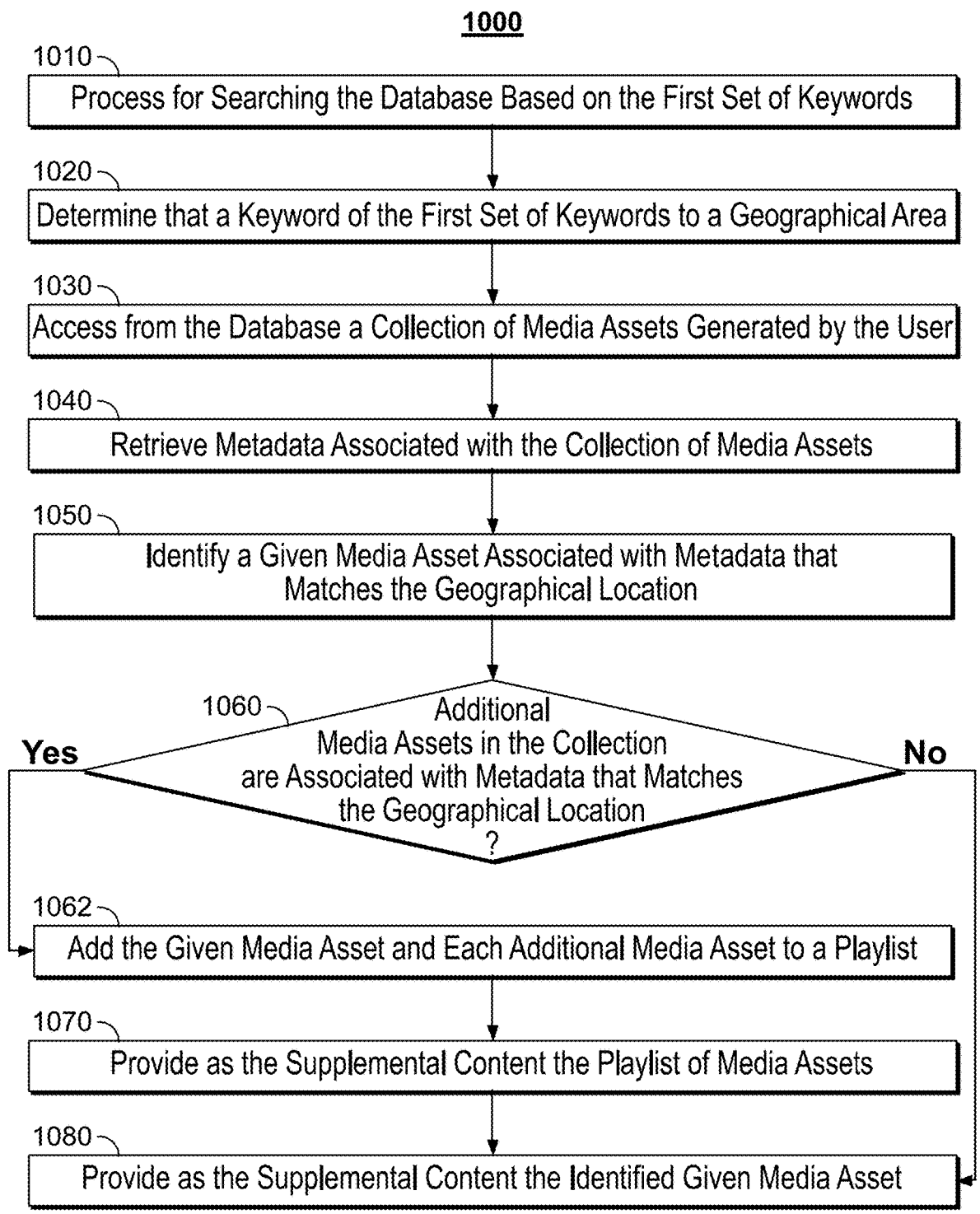
FIG. 10 is a flowchart representing a process for searching a database based on a set of keywords from print media in accordance with some embodiments of the disclosure.

FIG. 10 is a flowchart of a detailed illustrative process for searching a database based on a set of keywords from print media in accordance with some embodiments of the disclosure. It should be noted that process 1000 or any step thereof could be performed on, or provided by, any of the devices shown in FIGS. 5-6. For example, process 1000 may be executed by control circuitry 504 (FIG. 5) as instructed by a media guidance application implemented on a user device (e.g., augmented reality device embodied in user equipment devices 602, 604, and/or 606 (FIG. 6)) in order to search the database based on a set of keywords. In addition, one or more steps of process 1000 may be incorporated into or combined with one or more steps of any other process or embodiment (e.g., as described in relation to FIGS. 1, 2, and 7-12).

At step 1010, the process for searching the database based on the first set of keywords begins. For example, control circuitry 504 begins this process to perform step 892 (FIG. 8).

At step 1020, a determination is made that a keyword of the first set of keywords relates to a geographical area. For example, control circuitry 504 may determine that the first set of keywords includes a name of a city. Accordingly, control circuitry 504 may define the geographical area to be GPS coordinates associated with the name of the city.

At step 1030, a collection of media assets generated by the user is accessed from the database. For example, control circuitry 504 may access a local or remote database to obtain or identify pictures and videos generated or captured by the user.

At step 1040, metadata associated with the collection of media assets is retrieved. For example, control circuitry 504 may retrieve for each media asset metadata including GPS coordinates and time/date stamps.

At step 1050, a given media asset associated with metadata that matches the geographical location is identified. For example, control circuitry 504 may compare the GPS coordinates associated with the media assets generated by the user with the GPS coordinates of the city. If the GPS coordinates of the media assets are within the boundaries of the GPS coordinates of the city, control circuitry 504 may determine that the given media asset matches the geographical location of the print media.

At step 1060, a determination is made as to whether additional media assets in the collection are associated with metadata that matches the geographical location. In response to determining that additional media assets are associated with the metadata that matches the location, the process proceeds to step 1062, otherwise the process proceeds to step 1080.

At step 1062, the given media asset and each additional media asset are added to a playlist. For example, control circuitry 504 may store the media assets in a playlist and order the media assets according to various criteria (e.g., chronologically by time and/or date, by distance based on GPS coordinates, by type of media asset, by source, etc.).

At step 1070, the playlist of media assets is provided as the supplemental content.

At step 1080, the identified given media asset is provided as the supplemental content.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 10.

FIG. 11 is a flowchart of a detailed illustrative process for searching a database based on a set of keywords from print media in accordance with some embodiments of the disclosure. It should be noted that process 1100 or any step thereof could be performed on, or provided by, any of the devices shown in FIGS. 5-6. For example, process 1100 may be executed by control circuitry 504 (FIG. 5) as instructed by a media guidance application implemented on a user device (e.g., augmented reality device embodied in user equipment devices 602, 604, and/or 606 (FIG. 6)) in order to search the database based on a set of keywords. In addition, one or more steps of process 1100 may be incorporated into or combined with one or more steps of any other process or embodiment (e.g., as described in relation to FIGS. 1, 2, and 7-12).

At step 1110, the process for searching the database based on the first set of keywords begins. For example, control circuitry 504 begins this process to perform step 892 (FIG. 8).

At step 1120, a list of content in the print media is accessed from the database. For example, control circuitry 504 may access a server associated with a source of the newspaper (if the print media is a newspaper) and obtain a list of all the articles and pages associated with those articles from the source. Control circuitry 504 may transmit to the server the name of the newspaper and date associated with the newspaper.

At step 1130, other content that is related to the first set of keywords is identified from the list of content. For example, control circuitry 504 may determine that the first set of keywords corresponding to first portion 110 which is on page 1 relate to weather, which is also described further in a weather section on page 10.

At step 1140, a determination is made that the other content is located in a second page of the print media.

At step 1150, the other content and a reference to the second page of the print media are provided as the supplemental content. For example, control circuitry 504 may obtain all or a portion of the article that is related to the weather that is on page 10 of the newspaper and present that as supplemental content on page 1 together with first portion 110.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 11.

Figure 12:
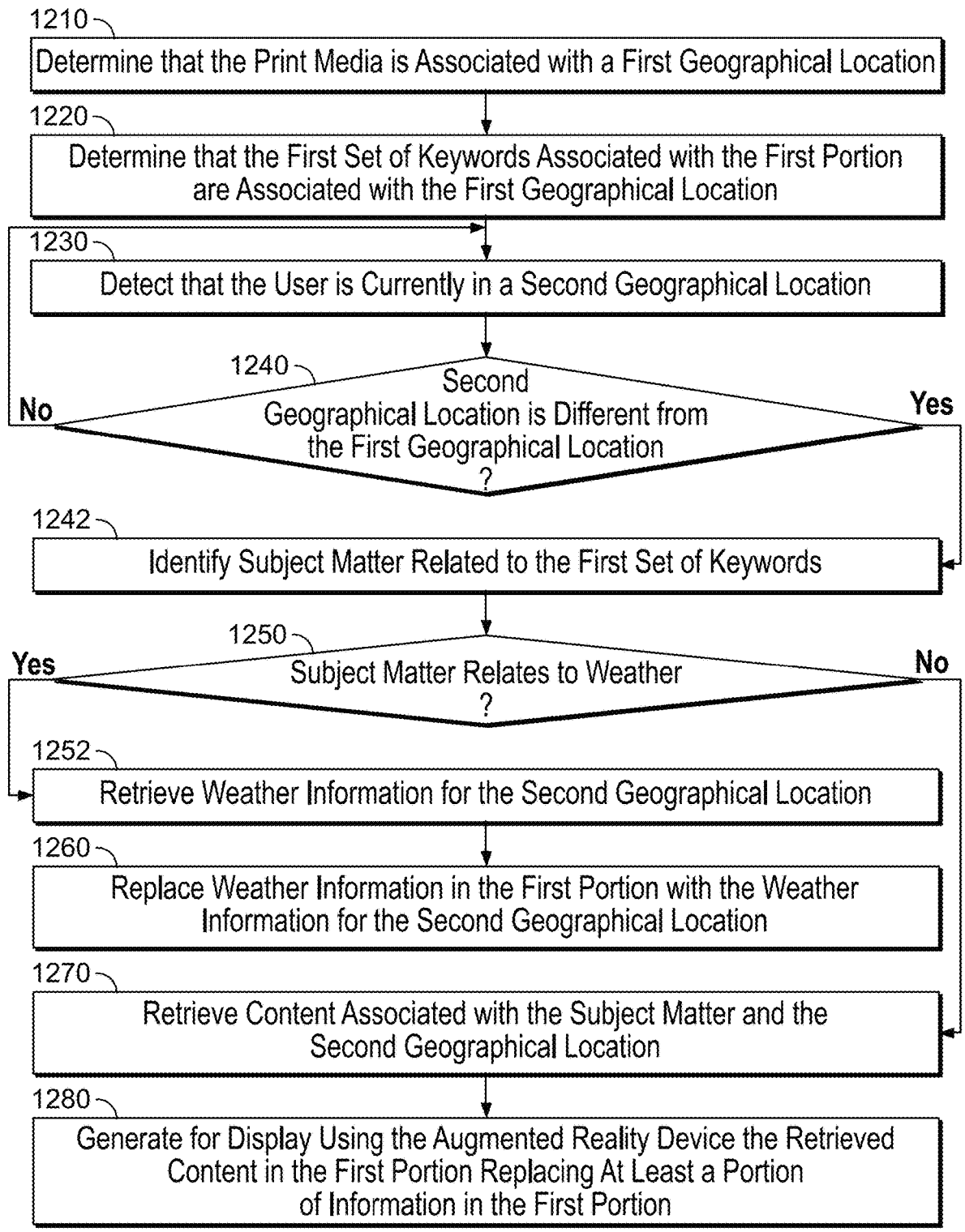
FIG. 12 is a flowchart representing a process for presenting geographically specific supplemental content over print media in accordance with some embodiments of the disclosure.

FIG. 12 is a flowchart of a detailed illustrative process for presenting geographically specific supplemental content over print media in accordance with some embodiments of the disclosure. It should be noted that process 1200 or any step thereof could be performed on, or provided by, any of the devices shown in FIGS. 5-6. For example, process 1200 may be executed by control circuitry 504 (FIG. 5) as instructed by a media guidance application implemented on a user device (e.g., augmented reality device embodied in user equipment devices 602, 604, and/or 606 (FIG. 6)) in order to present geographically specific supplemental content over print media. In addition, one or more steps of process 1200 may be incorporated into or combined with one or more steps of any other process or embodiment (e.g., as described in relation to FIGS. 1, 2, and 7-12).

At step 1210, a determination that the print media is associated with a first geographical location is made.

At step 1220, a determination that the first set of keywords associated with the first portion are associated with the first geographical location is made. For example, control circuitry 504 may determine that the first set of keywords includes a name of a city. Accordingly, control circuitry 504 may define the first geographical location to be GPS coordinates associated with the name of the city.

At step 1230, a detection is made that the user is currently in a second geographical location. For example, control circuitry 504 may retrieve GPS information from device 230 to determine the second geographical location of the user.

At step 1240, a determination is made as to whether the second geographical location is different from the first geographical location by more than a threshold amount. In response to determining that the second location is different from the first by more than a threshold amount, the process proceeds to step 1242, otherwise the process proceeds to step 1230. For example, control circuitry 504 may determine whether the user's current geographical location (e.g., the second geographical location) is more than a threshold distance (over 100 miles) from the geographical locale of the print media.

At step 1242, subject matter related to the first set of keywords is identified. For example, control circuitry 504 may determine whether the keywords include reference to weather information (e.g., if the words include temperatures and/or words related to weather (storm, winter, snow, etc.)) and if so, the subject matter may be determined to be weather. Alternatively, control circuitry 504 may determine whether the keywords include reference to politics (e.g., names of a president or congress member) and if so, the subject matter may be determined to be politics. Alternatively, control circuitry 504 may determine whether the keywords include reference to sports (e.g., the words football, names of players, names of stadiums, score information) and if so, the subject matter may be determined to be sports.

At step 1250, a determination is made as to whether the subject matter relates to weather. In response to determining that the subject matter is related to weather, the process proceeds to step 1252, otherwise the process proceeds to step 1270.

At step 1252, weather information for the second geographical location is retrieved. For example, control circuitry 504 may access a weather source (e.g., a weather website) and provide the GPS coordinates of device 230 to obtain current and future weather information for the user's current location.

At step 1260, weather information in the first portion is replaced with the weather information for the second geographical location. For example, control circuitry 504 may replace temperature and weather information in first portion 110 pertaining to the location of the print media with temperature and weather information 210 for the user's current location. For example, weather information pertaining to Palm Beach may be replaced with weather information for New York if the user is currently in New York and the print media is for Palm Beach.

At step 1270, content associated with the subject matter and the second geographical location is retrieved. For example, if the subject matter is sports and football, control circuitry 504 may retrieve sporting event information for a football team local to the current geographical location of the user.

At step 1280, the retrieved content is generated for display using the augmented reality device in the first portion replacing at least a portion of information in the first portion. For example, control circuitry 504 may replace a football team score information associated with the location of the print media with the football team score information of the team local to the user.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 12.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   identifying weather information in a content item that is viewable through an augmented reality device;
   determining that the identified weather information describes weather for a first geographical location that is different than a second geographical location of the augmented reality device by:
   computing a distance between the first geographical location and the second geographical location; and
   in response to determining that the distance is greater than a threshold distance, determining that the second geographical location is different from the first geographical location;
   in response to determining that the identified weather information describes the weather for the first geographical location that is different than the second geographical location of the augmented reality device:
   retrieving weather information that describes weather for the second geographical location of the augmented reality device; and
   generating for display, using the augmented reality device, the retrieved weather information such that the retrieved weather information overlays the identified weather information in the content item.

2. The method of claim 1, wherein generating for display the retrieved weather information for the second geographical location such that the retrieved weather information overlays the identified weather information in the content item comprises:
   determining a position of the identified weather information in the content item; and
   generating for display a virtual image of the retrieved weather information for the second geographical location as an overlay at the position of the identified weather information.

3. The method of claim 1, further comprising:
   accessing a database comprising weather information; and
   retrieving the weather information that describes the weather for the second geographical location from the database.

4. The method of claim 1, further comprising:
   detecting a visual focus through the augmented reality device on a portion of the content item; and
   in response to detecting the visual focus, retrieving supplemental content associated with the portion of the content item.

5. The method of claim 1, further comprising:
   accessing a user profile;
   retrieving supplemental content based on one or more user preferences of the user profile; and
   generating for display, using the augmented reality device, the supplemental content.

6. The method of claim 5, wherein the supplemental content comprises video content.

7. The method of claim 1, wherein the content item comprises print content.

8. The method of claim 1, wherein the content item is displayed on another device different from the augmented reality device.

9. A method comprising:
   identifying weather information in a content item that is viewable through an augmented reality device;
   determining that the identified weather information describes weather for a first geographical location that is different than a second geographical location of the augmented reality device by:
      identifying one or more keywords in the content item indicative of the first geographical location;
      retrieving global positioning system (GPS) information corresponding to the augmented reality device;
      determining, based on the GPS information, the second geographical location for the augmented reality device; and
      determining that the second geographical location does not match the one or more keywords indicative of the first geographical location;
   in response to determining that the identified weather information describes the weather for the first geographical location that is different than the second geographical location of the augmented reality device:
      retrieving weather information that describes weather for the second geographical location of the augmented reality device; and
      generating for display, using the augmented reality device, the retrieved weather information such that the retrieved weather information overlays the identified weather information in the content item.

10. A system comprising:
    an augmented reality device; and
    control circuitry configured to:
       identify weather information in a content item that is viewable through the augmented reality device;
       determine that the identified weather information describes weather for a first geographical location that is different than a second geographical location of the augmented reality device by:
          computing a distance between the first geographical location and the second geographical location; and
          in response to determining that the distance is greater than a threshold distance, determining that the second geographical location is different from the first geographical location;
       in response to determining that the identified weather information describes the weather for the first geographical location that is different than the second geographical location of the augmented reality device:
          retrieve weather information that describes weather for the second geographical location of the augmented reality device; and
          generate for display, using the augmented reality device, the retrieved weather information such that the retrieved weather information overlays the identified weather information in the content item.

11. The system of claim 10, wherein the control circuitry, when generating for display the retrieved weather information for the second geographical location such that the retrieved weather information overlays the identified weather information in the content item, is configured to:
    determine a position of the identified weather information in the content item; and
    generate for display a virtual image of the retrieved weather information for the second geographical location as an overlay at the position of the identified weather information.

12. The system of claim 10, wherein the control circuitry, when determining that the identified weather information describes the weather for the first geographical location that is different than the second geographical location of the augmented reality device, is configured to:
    identify one or more keywords in the content item indicative of the first geographical location;
    retrieve global positioning system (GPS) information corresponding to the augmented reality device;
    determine, based on the GPS information, the second geographical location for the augmented reality device; and
    determine that the second geographical location does not match the one or more keywords indicative of the first geographical location.

13. The system of claim 10, wherein the control circuitry is further configured to:
    access a database comprising weather information; and
    retrieve the weather information that describes the weather for the second geographical location from the database.

14. The system of claim 10, wherein the control circuitry is further configured to:
    detect a visual focus through the augmented reality device on a portion of the content item; and
    in response to detecting the visual focus, retrieve supplemental content associated with the portion of the content item.

15. The system of claim 10, wherein the control circuitry is further configured to:
    access a user profile;
    retrieve supplemental content based on one or more user preferences of the user profile; and
    generate for display, using the augmented reality device, the supplemental content.

16. The system of claim 15, wherein the supplemental content comprises video content.

17. The system of claim 10, wherein the content item comprises print content.

18. The system of claim 10, wherein the content item is displayed on another device different from the augmented reality device.

* * * * *

UNITED STATES PATENT AND TRADEMARK OFFICE
CERTIFICATE OF CORRECTION

| | | |
|---|---|---|
| PATENT NO. | : 12,229,907 B2 | Page 1 of 1 |
| APPLICATION NO. | : 18/372904 | |
| DATED | : February 18, 2025 | |
| INVENTOR(S) | : Lucas Waye et al. | |

It is certified that error appears in the above-identified patent and that said Letters Patent is hereby corrected as shown below:

On the Title Page

Item (71), Applicant: change "Adeia Guides, Inc." to --Adeia Guides Inc.--

Signed and Sealed this
Eighteenth Day of March, 2025

Coke Morgan Stewart
*Acting Director of the United States Patent and Trademark Office*